United States Patent
Tsukamoto

(10) Patent No.: US 6,611,484 B2
(45) Date of Patent: Aug. 26, 2003

(54) OPTICAL RECORDING MEDIUM AND METHOD

(75) Inventor: Syuji Tsukamoto, Tokyo (JP)

(73) Assignee: TDK Corporation, Tokyo (JP)

( * ) Notice: Subject to any disclaimer, the term of this patent is extended or adjusted under 35 U.S.C. 154(b) by 43 days.

(21) Appl. No.: 09/973,042

(22) Filed: Oct. 10, 2001

(65) Prior Publication Data

US 2002/0041556 A1 Apr. 11, 2002

(30) Foreign Application Priority Data

Oct. 10, 2000 (JP) ........................... 2000-309331

(51) Int. Cl.⁷ .................................. F11B 7/00

(52) U.S. Cl. ................... 369/59.11; 369/47.51; 369/116

(58) Field of Search ............... 369/59.11, 116, 369/47.51, 47.5

(56) References Cited

U.S. PATENT DOCUMENTS 6,370,097 B1 * 4/2002 Hideki .............. 369/59.11

* cited by examiner

*Primary Examiner*—Nabil Nindi

(57) ABSTRACT

An optical recording medium, which is suitable for multi-level recording forming a recording mark at multiple stages, is obtained. An optical recording medium, which is constructed in a manner that a recording mark is formed on the recording layer by irradiating a laser beam so as to record information, the recording layer being continuously formed in a relative moving direction to the laser beam with plural virtual recording cells, each of which has an arbitrary unit length and a unit width perpendicular to the unit length in the relative moving direction, plural-stage irradiation times being set with respect to the virtual recording cell so that the irradiation time becomes long successively from the first to final stages, a laser beam power being set in at least one irradiation time of the plural-stage irradiation times so as to intermittently become larger than a predetermined threshold value when the laser beam is irradiated to the virtual recording cell, and recording marks being formed in the virtual recording cell and giving plural-stages different optical reflectance to the virtual recording cell.

24 Claims, 8 Drawing Sheets

OPTICAL RECORDING MEDIUM AND METHOD

BACKGROUND OF THE INVENTION

1. Field of the Invention

The present invention relates to an optical recording medium and method, which record information by irradiating a laser beam to a recording layer so as to form a recording mark, and in particular, to a technology of forming a plurality of recording marks having different state so as to record a data at a multi-level.

2. Description of the Related Art

In a conventional optical recording medium, a method has been employed such that a data is recorded by changing a length of read signal (i.e., a length of reflection signal modulation section). On the contrary, the following method has been frequently studied, more specifically, a plurality of data is recorded to each signal having the same length by changing a depth of the read signal (i.e., a modulation degree of reflection signal) at multiple stages.

According to the above optical recording method, as compared with the case where a binary data is merely recorded by the presence of pit, a plurality of data is recorded in a depth direction, so that a signal quantity allocated to a constant length can be increased; therefore, it is possible to improve a track recording density. In general, it is well known to change a power of laser beam at multiple stages, as the method of a depth of read signal at multiple stages. Recently, a recording medium having a multiple recording layer has been proposed as the recording medium.

In this case, it is called as multi-level recording to record each data so that a modulation degree of reflection signal is variable at multiple stages.

In the above multi-level recording, a laser beam is irradiated at multiple-stage power in recording; for this reason, in particular, when the power of laser beam gradually becomes large, a problem has arisen such that a signal quality is worsened in reading.

In particular, in order to achieve a high density of the recording information of recording medium, in the case where multi-level recording is carried out in a manner of making small a recording mark, and changing a laser power at multiple stages, a signal quality has remarkably worsened in the recording mark recorded by large laser power.

In general, a diameter of the collected beam is expressed as Kλ/NA (K: constant, λ: laser wavelength, NA: numerical aperture of lens. For example, in a pickup used for a CD, the laser wavelength λ is 780 nm, the numerical aperture NA is 0.50, and the diameter of collected beam is about 0.8 μm. Thus, when the recording mark length is made small up to the vicinity of about 0.8 μm, the above problem of signal deterioration has remarkably arisen. In fact, it is very difficult to achieve five-stage or more multi-level recording by the method of changing a laser power.

Further, likewise, the conventional concept of achieving the multi-level recording by stepwise changing the laser power is based on the following premise that the recording mark length is at least larger than a radius of focused beam (beam waist) in recording. Therefore, there is some limitation to improve a recording density unless a size of the focused beam is made small.

On the contrary, although is unknown when this application has been filed, an optical recording method has been disclosed in Japanese Patent application No. 2000-187568 filed by the same applicant as this application. More specifically, according to the above optical recording method, in place of the power of laser beam, an irradiation time to a predetermined virtual recording cell area is changed at multiple stages. By doing so, a recording mark (low optical reflectance area) having different size is formed in the virtual recording cell and giving different optical reflectance to the entire virtual recording cell; therefore, at least five-stage multi-level recording is possible.

The above optical recording method is a concept quite different from the conventional laser beam irradiation, and a recording mark may be formed by a short-time irradiation. Therefore, the case is sufficiently considered such that a recording mark smaller than a beam spot diameter is formed. In other words, multi-stage and high density multi-level recording can be realized by effectively using an area in which the recording mark has been conventionally considered as being incomplete.

SUMMARY OF THE INVENTION

The present invention has been made in order to further study the above technology. Accordingly, an object of the present invention is to provide an optical recording medium, which can achieve multi-stage (multi-level) and high read-accuracy multi-level recording by irradiating a laser beam.

The present inventors have earnestly studied optical recording medium and method; as a result, they have confirmed that it is possible to carry out multi-stage and stable high density multi-level recording.

(1) In order to achieve the above object, according to one aspect, the present invention provides an optical recording medium, including a reflective layer and a recording layer, and constructed in a manner that a recording mark is formed on the recording layer by irradiating a laser beam so as to record information, the recording layer being continuously formed in a relative moving direction to the laser beam with plural virtual recording cells, each of which has an arbitrary unit length and a unit width perpendicular to the unit length in the relative moving direction, plural-stage irradiation times being set with respect to the virtual recording cell so that the irradiation time becomes long successively from the first to final stages, a laser beam power being set in at least one irradiation time of the plural-stage irradiation times so as to intermittently become larger than a predetermined threshold value when the laser beam is irradiated to the virtual recording cell, and recording marks being formed in the virtual recording cell, the recording marks giving plural-stages different optical reflectance to the virtual recording cell.

recording marks having plural-stages different optical reflectance being formed in the virtual recording cell.

(2) Further, the present invention provides an optical recording medium, including a reflective layer and a recording layer, and constructed in a manner that a recording mark is formed on the recording layer by irradiating a laser beam so as to record information, the recording layer being continuously formed in a relative moving direction to the laser beam with plural virtual recording cells, each of which has an arbitrary unit length and a unit width perpendicular to the unit length in the relative moving direction, plural-stage irradiation times being set so that the irradiation time becomes long successively from the first to final stages, and the laser beam being irradiated to the virtual recording cell in accordance with the irradiation times so that recording marks being formed in the virtual recording cell, the recording marks giving plural-stages different optical reflectance to the virtual recording cell.

in at least one of the plural-stage irradiation times, the irradiated laser beam being irradiated in a state that the case where the laser beam power is large and the case where it is small are alternately continued so that the recording mark is formed.

(3) Further, the present invention provides the optical recording medium, wherein the power of laser beam is controlled in at least final stage irradiation time.

(4) Further, the present invention provides the optical recording medium, wherein in the case where an optical reflectance of non-recording state in the recording medium is set as K, the power of laser beam is controlled so that the recording mark having an optical reflectance less than 0.6K is formed.

(5) Further, the present invention provides the optical recording medium, wherein the power of laser beam is controlled from the midway time point to the termination time point in the irradiation time.

(6) Further, the present invention provides the optical recording medium, wherein the midway time point is set after the intermediate time point in the irradiation time.

(7) Further, the present invention provides the optical recording medium, wherein the irradiation time has at least five stages from the first stage to the final stage.

(8) Moreover, in order to achieve the above object, according to another aspect, the present invention provides an optical recording method, which irradiates an laser beam to an optical recording medium including a reflective layer and a recording layer, and forms a recording mark is formed on the recording layer so as to record information, comprising the following stages of:

continuously forming plural virtual recording cells, each of which has an arbitrary unit length and a unit width perpendicular to the unit length the recording layer being in a relative moving direction to the laser beam with in the relative moving direction;

setting plural-stage irradiation times with respect to the virtual recording cell so that the irradiation time becomes long successively from the first to final stages;

setting a laser beam power in at least one irradiation time of the plural-stage irradiation times so as to intermittently become larger than a predetermined threshold value when the laser beam is irradiated to the virtual recording cell; and forming recording marks being formed in the virtual recording cell, the recording marks giving plural-stages different optical reflectance to the virtual recording cell.

(9) Further, the present invention provides an optical recording method, which irradiates an laser beam to an optical recording medium including a reflective layer and a recording layer, and forms a recording mark is formed on the recording layer so as to record information, comprising the following stages of:

continuously forming plural virtual recording cells, each of which has an arbitrary unit length and a unit width perpendicular to the unit length in a relative moving direction to the laser beam, in the relative moving direction, with respect to the virtual recording cell;

setting plural-stage irradiation times so that the irradiation time becomes long successively from the first to final stages, and irradiating the laser beam to the virtual recording cell in accordance with the irradiation times so that recording marks being formed in the virtual recording cell, the recording marks giving plural-stages different optical reflectance to the virtual recording cell.
and reducing a change speed of optical reflectance of the virtual recording cell in the termination side of the irradiation time in at least one of the plural-stage irradiation times so that the irradiated laser beam being irradiated in a state that the case where the laser beam power is large and the case where it is small are alternately continued so that the recording mark is formed.

(10) Further, the present invention provides the optical recording method, wherein the power of laser beam is controlled so as to intermittently become larger than a predetermined threshold value in at least final stage irradiation time.

(11) Further, the present invention provides the optical recording method, wherein in the case where an optical reflectance of non-recording state in the recording medium is set as K, the power of laser beam is controlled so as to intermittently become larger than a predetermined threshold value so that the recording mark having an optical reflectance less than 0.6K is formed.

(12) Further, the present invention provides the optical recording method, wherein the power of laser beam is controlled so as to intermittently become larger than a predetermined threshold value from the midway time point to the termination time point in the irradiation time.

(13) Further, the present invention provides the optical recording method, wherein the midway time point is set after the intermediate time point in the irradiation time.

(14) Further, the present invention provides the optical recording method, wherein the irradiation time has at least five stages from the first stage to the final stage.

DETAILED DESCRIPTION OF THE PREFERRED EMBODIMENTS

First, a description on the principle of the present invention is followed.

Figure 1:
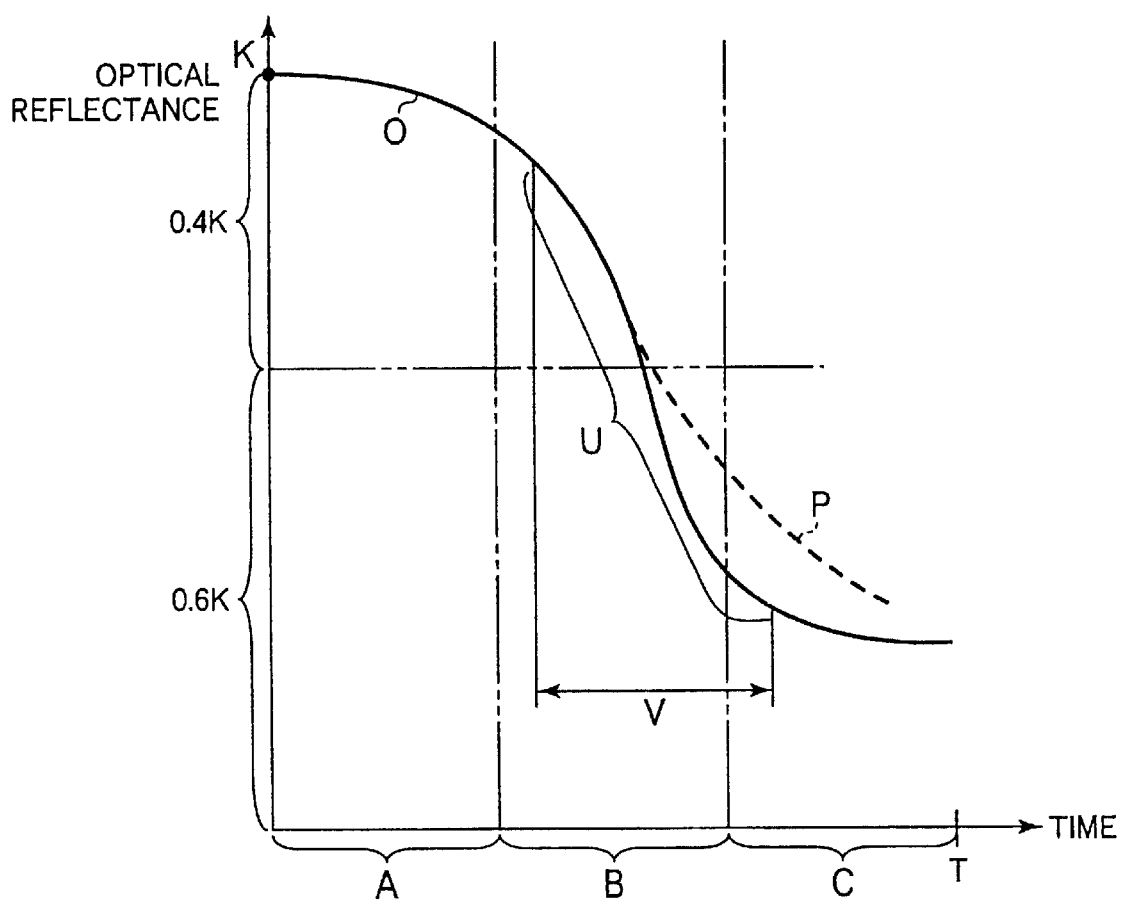
FIG. 1 is a diagram to schematically explain a relation between a power of laser beam and an optical reflectance of a virtual recording cell in the present invention.

FIG. 1 shows a relation between a reduction state (shown by the solid line O) of optical reflectance of a virtual recording cell (including a recording mark) and a time. In this case, the recording mark is formed in the virtual recording cell when a laser beam is irradiated to the virtual recording cell at a constant power (time average is constant) over the maximum irradiation time T (maximum time usable for recording each virtual recording cell: this is called as allowable irradiation time).

As shown by the solid line O in FIG. 1, in the case where a laser beam is irradiated under the condition that the stage power is constant, an optical reflectance is not almost reduced in the initial time area A. Then, the optical reflectance is gradually reduced in an intermediate time area B, and further, its reduction speed increases as time elapses. In a termination time area C, the reduction speed increased in the intermediate time area gradually decreases, and then, the optical reflectance converges onto the lower limit value.

The irradiation time of laser beam is preset at multiple stages, and then, the laser beam is irradiated to the virtual recording cell so as to form a recording mark having different size, then to give diffrent optical reflectance to the virtual recording cell; in this case, the more the number of stages of the irradiation time is, the more a recording density can be improved. However, in the case where the maximum irradiation time (i.e., allowable irradiation time) T usable for one virtual recording cell is constant, when the irradiation time is preset at multiple stages within a range of the allowable irradiation time, a "difference" between irradiation time becomes small. For this reason, it is difficult to accurately make the "difference" in the optical reflectance. If the difference of optical reflectance is too small, it is impossible to identify each virtual recording cell including recording mark in reading.

Considering the above problem, in order to improve a read accuracy, the "difference" of optical reflectance must be securely made; therefore, it is desirable to obtain a large change of optical reflectance by a slight change of irradiation time. For example, in the case of the recording layer having a characteristic as shown by the solid line O, a preferable area actually usable for multi-level recording is an effective usable area U from the intermediate time area B to the termination time area C where the optical reflectance is securely reduced. Thus, the irradiation time is preset at multiple stages in an effective time stage range V corresponding to the above area U. By doing so, five (5) stages or more multi-level recording can be actually realized.

However, the present inventors have found that the effective usable area U is not still sufficiently and effectively used.

Figure 2:
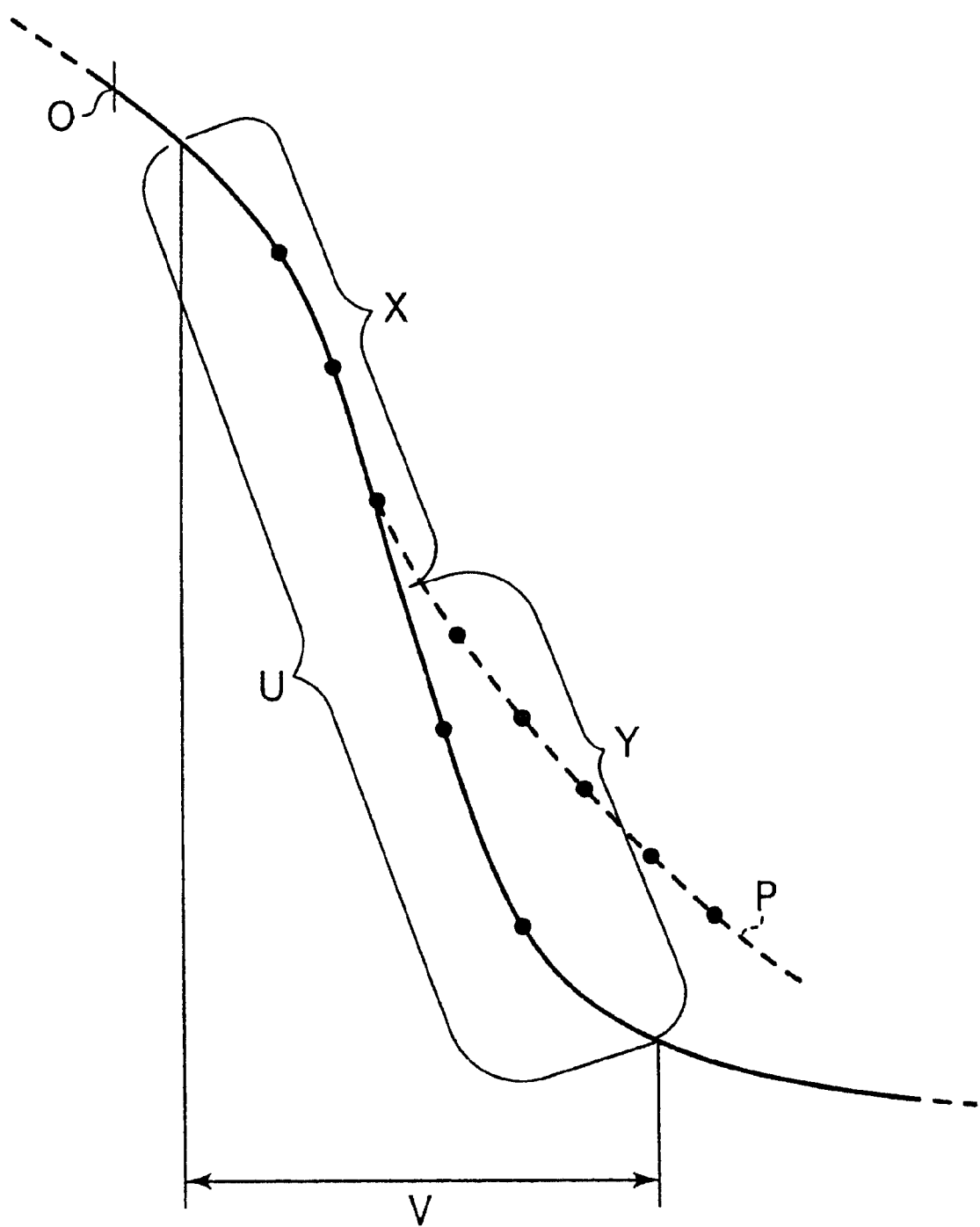
FIG. 2 is a diagram partially enlarging an effective usable area shown in FIG. 1.

As enlarged in FIG. 2, the following matter can be seen. More specifically, in a first half range X of the effective usable area U, the optical reflectance is reduced relatively gentle; however, in a second half range Y of the area U, the optical reflectance is rapidly reduced because heat accumulation increases in the virtual recording cell. Thus, even if a laser beam irradiation is completed in the second half range Y, a reduction speed is large; for this reason, it is difficult to accurately stage a change of the recording layer with a desired optical reflectance. Therefore, this is a factor of making large a shift (error) of optical reflectance in the virtual recording cell including recording marks formed with respect to an irradiation time of laser beam. As a result, in the second half range Y, an interval, that is, difference between the optical reflectance must be preset larger considering the above shift (error), and further, there is some limitation of achieving multi-stage recording.

In order to solve the above problem, the present inventors have been interested to control a change (reduction) speed of the optical reflectance. More specifically, the laser beam is irradiated to the virtual recording cell so that its stage power intermittently exceeds a predetermined threshold value. In this case, a control is carried out in a manner that the stage power intermittently becomes large than the predetermined threshold value, or a large power and a small power are alternately continuously used. The above control is called as a multi-pulse control.

By doing so, according to the intermittent state, the heat accumulation of the virtual recording cell is controlled. Therefore, it is possible to relieve (restrict) a change speed of optical reflectance of the virtual recording cell, and to obtain a change speed of optical reflectance suitable for forming the recording mark.

For example, as shown by the dotted line P in FIG. 1 and FIG. 2, it is preferable to reduce a change speed in the above second half arrange Y in particular. This means to restrict an increase of reduction speed of the optical reflectance in the termination time area of each irradiation time; therefore, it is possible to securely stage the reduction speed at a desired optical reflectance (within a small error range). Thus, the difference of optical reflectance between stages is made small, so that the number of stages can be further increased.

In this case, the reduction speed of optical reflectance is different depending upon a kind of used recording layer (kind of dye, etc) and a shape of grove. However, as seen from the above description, when the irradiation time is set longer (i.e., in the case of the irradiation time on the final stage side), the change speed of optical reflectance has a tendency to increase; therefore, it is effective to apply the present invention inclusive of the final stage. Further, the present invention is considerably effective in the case of forming a recording mark having an optical reflectance, which is variable more than 40% of the initial value K (see FIG. 1).

Within the stage irradiation time range of each stage, a timing of intermittently controlling the stage power, the intermittent interval and the like may be properly preset. In particular, it is preferable to carry out an intermittent control in the limited period, that is, from a certain midway time point to the termination time point. By doing so, the change of optical reflectance is immediately facilitated by continuous irradiation until the midway time point from the irradiation start, and thereafter, the change speed can be gently reduced. Therefore, it is possible to set the irradiation time shorter as a whole, and set the difference of optical reflectance smaller. More preferably, the midway time point is set after the intermediate time point (½) of each irradiation time.

The "stage power" used in the present invention means an average output per unit time of laser beam.

Next, one embodiment of the present invention will be detailedly described below with reference to FIG. 3 to FIG. 7.

Figure 3:
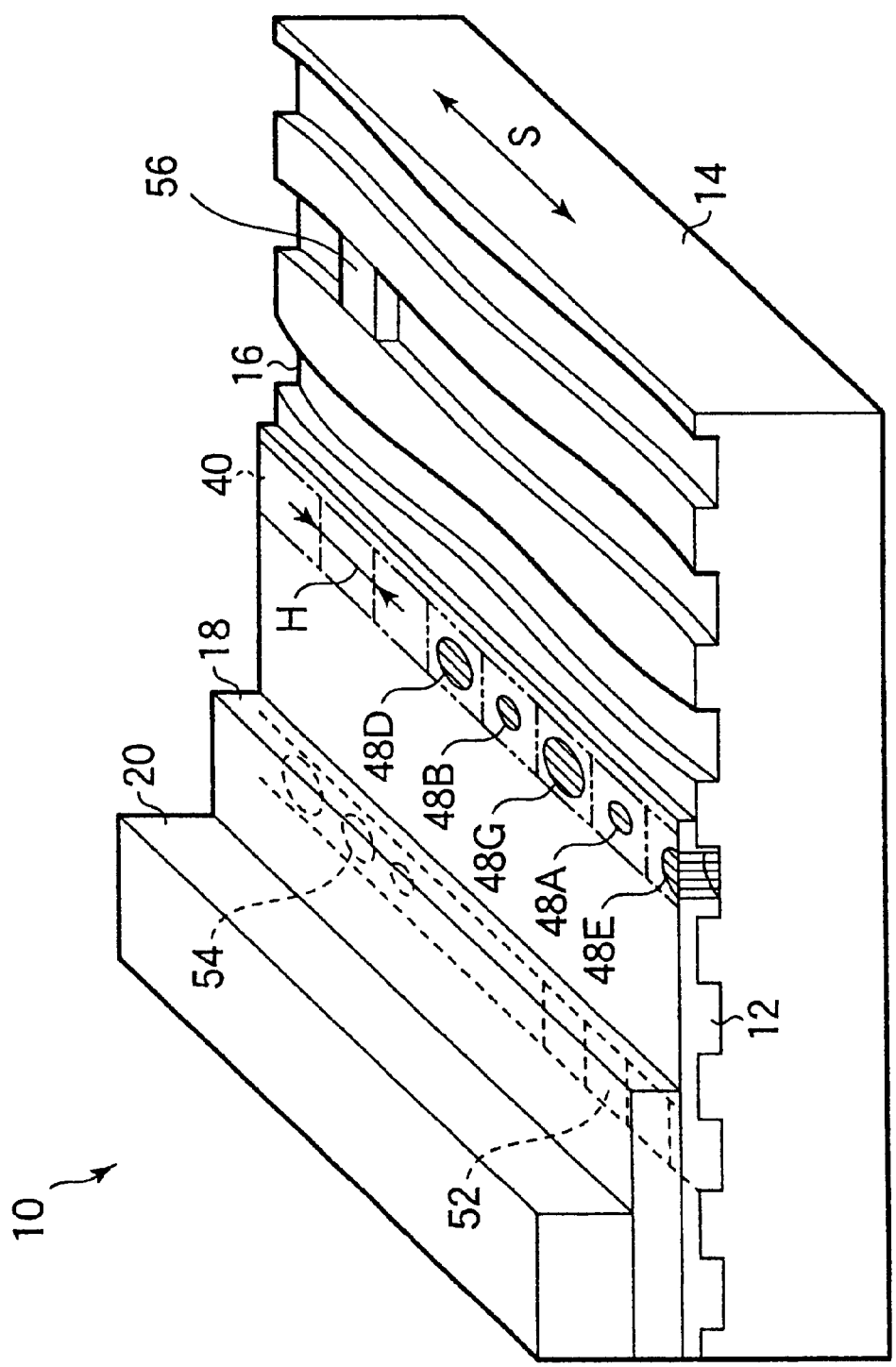
FIG. 3 is a perspective view partly in section showing principal parts of an optical recording medium to which an optical recording method according to one embodiment of the present invention is applied.

In FIG. 3, there is shown an optical recording medium (disk) 10 to which the optical recording method according to the first embodiment of the present invention is applied. The optical recording medium 10 is a CD-R having a recording layer 12 using a dye, and is composed of a substrate 14 made of transparent base material, the above recording layer 12, a gold or silver reflection film (layer) 18, and a protective layer 20. More specifically, the recording layer 12 is formed out of dye applied so as to cover a laser beam guide groove 16 formed on one side (upper surface in FIG. 1) of the substrate 14. The reflection film 18 is formed on the upper side of the recording layer 12 by spattering or the like, and the protective layer 20 is formed so as to cover the reflection layer 18.

The dye used for the recording layer 12 is an organic dye including cyanine, mero-cyanine, methine-based dye and its derivative, benzenethiol metal complex, phthalocyanine dye, naphthalocyanine dye, azo dye, etc.

Figure 4:
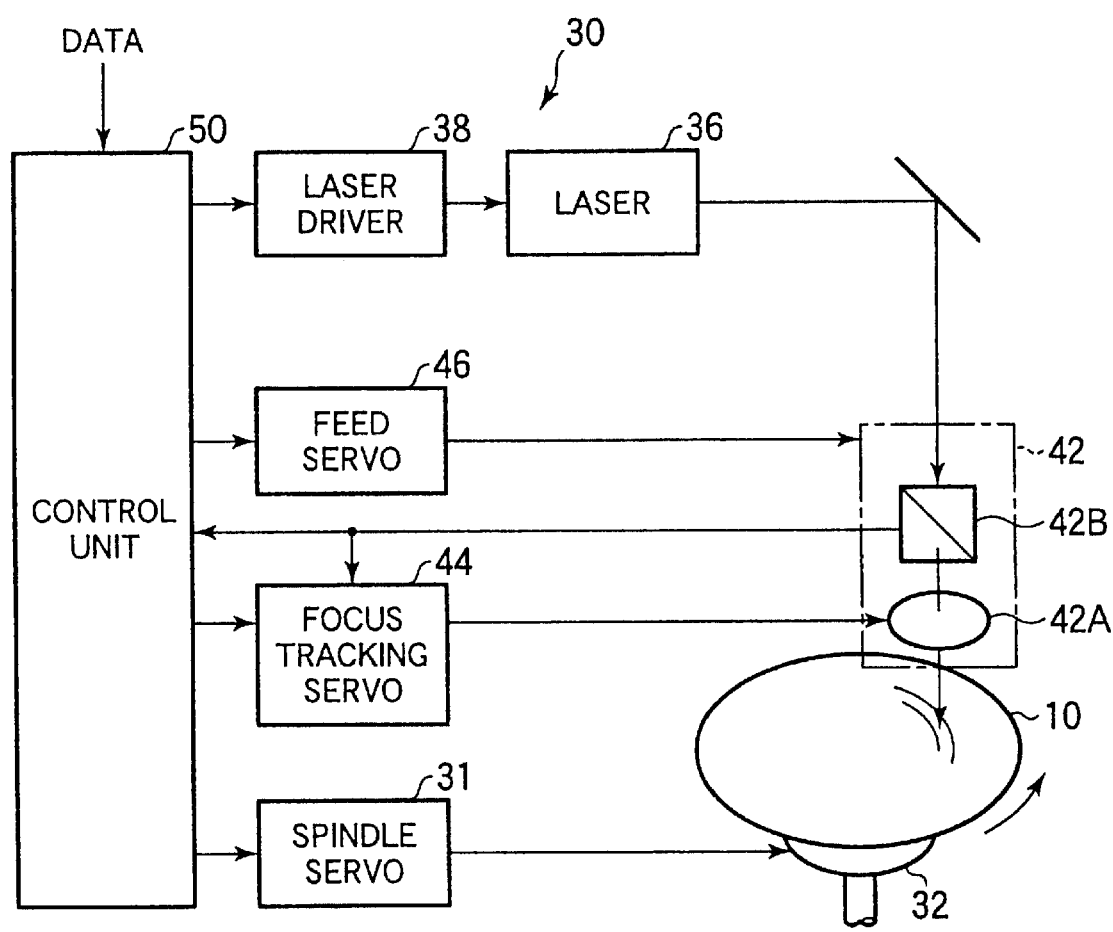
FIG. 4 is a block diagram showing an optical recording apparatus for recording information using a laser beam in order to record a data to the optical recording medium.

The optical recording method of the present invention applied to the optical recording medium 10 is carried out by using an optical recording apparatus 30 as shown in FIG. 4.

The optical recording apparatus 30 is a CD-R recorder. The optical recording apparatus 30 rotates the optical recording medium (disk) 10 by a spindle motor 32 via a spindle servo 31 under the condition of constant linear velocity, and then, records information onto the optical recording medium (disk) 10 by a laser beam irradiated from a laser 36.

Figure 5:
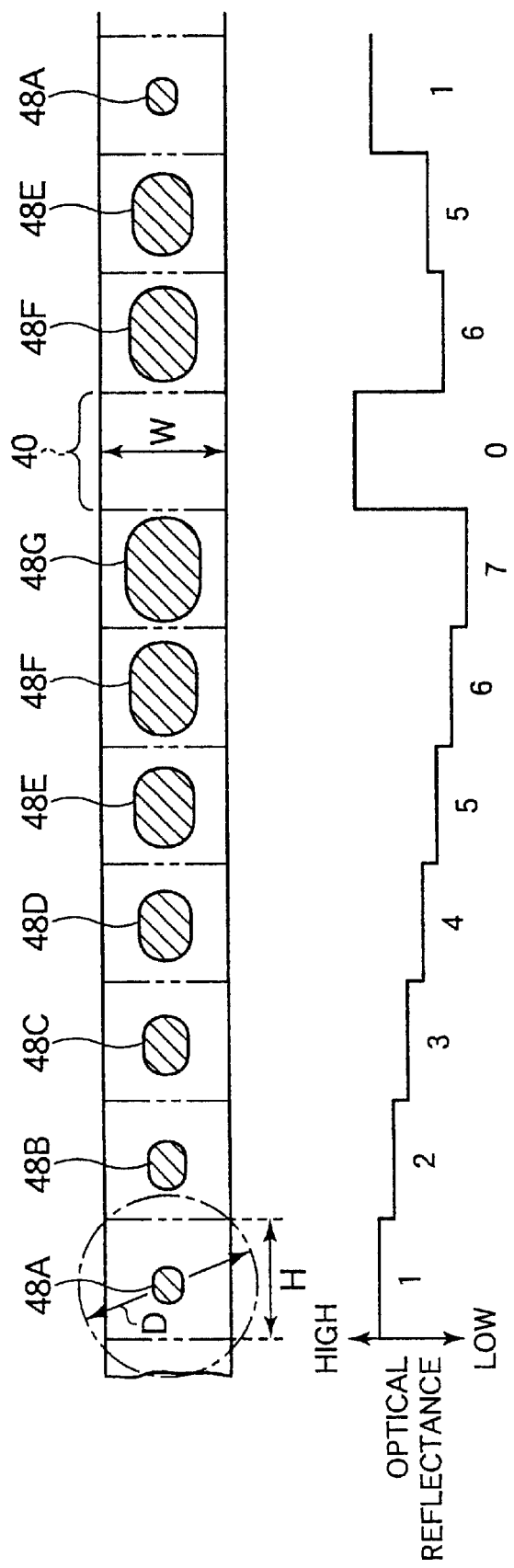
FIG. 5 is a schematic view showing a relation between a recording mark, the virtual recording cell and an optical reflectance of the virtual recording cell in the case of forming the recording mark on a recording layer by the above optical recording apparatus.
Figure 6:
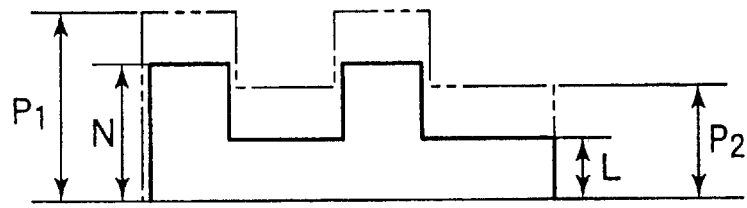
FIG. 6 is a view schematically showing a multi-pulse of laser beam in the optical recording apparatus.

In the above laser 36, a multi-pulse control is carried out with respect to its laser output. In accordance with information to be recorded, a laser beam irradiation time to one of virtual recording-cells (described later) 40 shown in FIG. 3 and FIG. 5, and an irradiation power are controlled by a laser driver 38. For example, as shown in FIG. 6, the multi-pulse interval is controlled by changing a continuous time of laser output. Further, the laser driver 38 has two power unit systems, and the first power unit and the second power unit are changed, and thereby, the irradiation is carried out at peak (instantaneous) power two stage (P1 and P2). As a result, the irradiation can be carried out at two-stage power, that is, an actual reference power N (actual average output of P1) and a low power L (actual average output of P2) smaller than the reference power N. In the case of rewritable type media such as CD-RW or the like, overwrite must be made; for this reason, the laser driver 38 has three power unit systems, and three-stage peak power may be preset.

In FIG. 4, a reference numeral 42 denotes a recording optical system including an objective lens 42A and a half-silvered mirror 42B. The objective lens 42A is controlled by a focus tracking servo 44 so that a laser beam is collected (focused) onto the recording layer 12 of the disk 10. Moreover, the objective lens 42A and the half silvered mirror 42B are controlled by a feed servo 46 so as to move at a predetermined speed from the inner peripheral side to the outer peripheral side of the disk 10 in synchronous with the rotation of the disk 10.

The above-mentioned spindle servo 31, laser driver 38, focus tracking servo 44 and feed servo 46 are controlled by a control unit 50. The data (information) to be recorded on the recording layer 12 is inputted to the control unit 50.

Subsequently, the following is a description on the virtual recording cell 40 and a recording mark recorded in the virtual recording cell 40.

As shown in FIG. 3, plural virtual recording cells 40 are continuously formed along a rotational direction, that is, a circumferential direction S of the disk 10 in the groove 16. As shown in FIG. 5, a length H in the circumferential direction of each virtual recording cell 40 is set shorter than a beam diameter (diameter of beam waist) D. Then, a laser beam is irradiated for each virtual recording cell 40 (this recording method will be described later), and thereby, recording marks 48A to 48G as schematically shown in FIG. 4 are formed in accordance with information to be recorded.

In this case, a size (magnitude) of the recording marks 48A to 48G expresses a degree of reduction of optical reflectance in each virtual recording cell 40 including recording mark. Namely, the larger the recording marks shown in FIG. 4 are formed, the lower the optical reflectance is. In fact, by a kind of dye used for the recording layer 12, the size and optical or the size transmittance of these recording marks 48A to 48G is variable in accordance with a laser beam irradiation time. The optical reflectance in the area of recording marks 48A to 48G is lowered. Further, if the optical reflectance of the virtual recording cell 40 of non-recording state is set as K, the first to third stage recording marks 48A to 48C is set larger than 0.6K, and the fourth to seventh stage recording marks 48D to 48G is set less than 0.6K.

By doing so, for example, it is possible to form seven-stage recording marks 48A to 48G (the reduction of optical reflectance is expressed by each size of the recording marks) as shown in FIG. 5. Further, in the case where a read laser beam is irradiated to the virtual recording cells 40 including the recording marks 48A to 48G, it is possible to recognize an optical reflectance of reflected light at seven stages.

In this case, the optical transmittance of the recording marks 48A to 48G changes. This has the same meaning such that the material forming the recording layer 12 in the recording marks 48A to 48G is decomposed and modified in its quality by the laser beam irradiation, and then, the modified degree (what is called, burned degree) is different in each of the recording marks 48A to 48G. Therefore, the optical reflectance changes, and the modified portion (what is called, burned portion) is different in the thickness direction, and thereby, the optical reflectance changes.

Next, the following is a description on an optical recording method.

As already described in the optical recording medium 10, the virtual recording cell 40 is continuously provided along the relative moving direction S so as to have an arbitrary unit length H along the relative moving direction to the laser beam and a unit width W perpendicular to the length H. In this embodiment, the optical recording medium 10 is rotating at a predetermined speed (in this case, 4.8 m/s); therefore, a continuous predetermined time (in this case, 125 ns) is arbitrarily preset in the optical recording apparatus 30, and thereby, the unit length H (0.6 μm=4.8 m/s×125 ns) of the virtual recording cell 40 is determined.

Incidentally, the unit width W of the virtual recording cell 40 is determined as the width of the groove 16; in this case, the width other than above may be determined.

Figure 7:
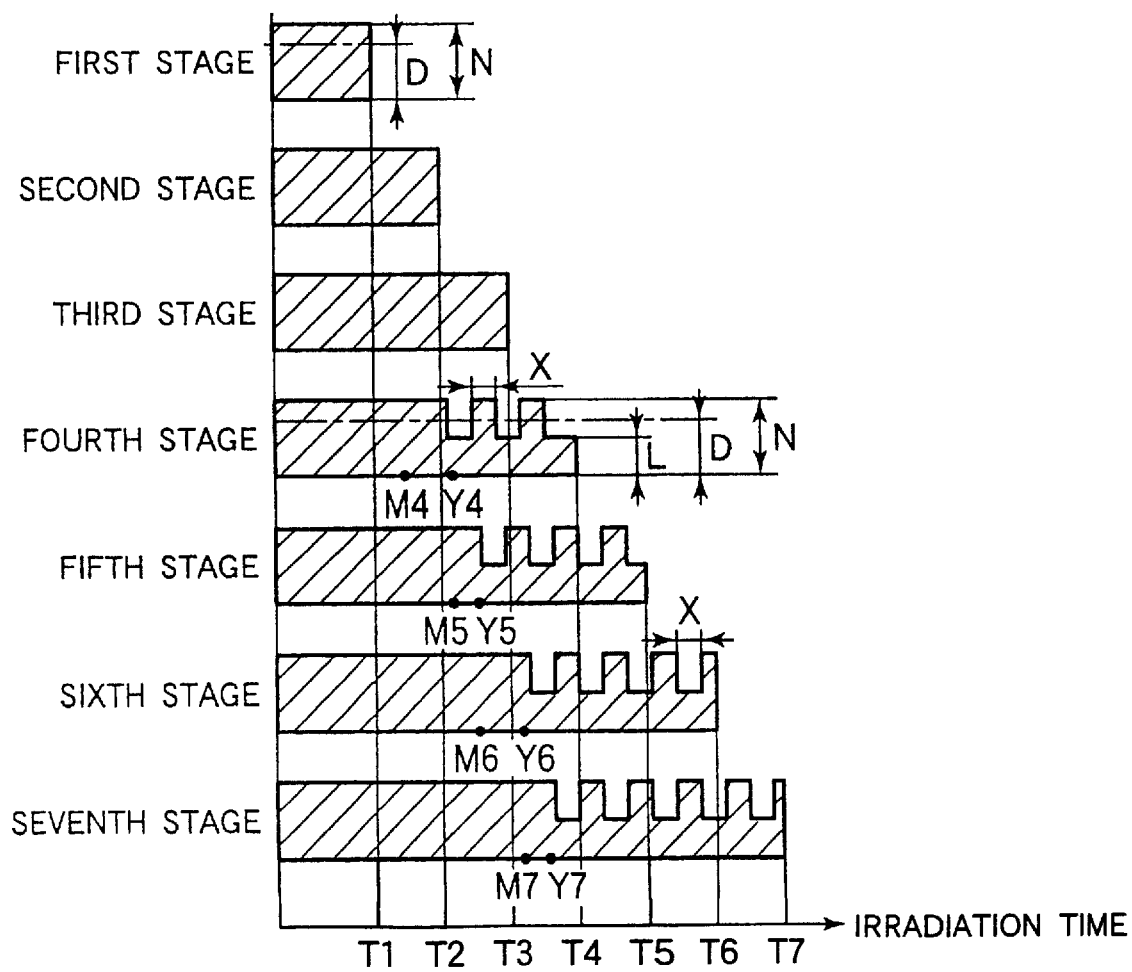
FIG. 7 is a time chart showing a power of laser beam set in each stage irradiation time.

Moreover, as shown in FIG. 7, plural stage irradiation times T1 to T7 (seven (7) stages in this embodiment) are preset with respect to the virtual recording cell 40. In this case, the stage of irradiation time includes the first stage to the final stage, which successively become long.

A predetermined threshold value D is set between the two-stage powers (reference power N and low power L) of the laser beam. In the first to third stage irradiation times T1 to T3, the power of laser beam is set to the reference power N from the irradiation start time point to the termination time point. The reference power N is larger than the threshold value D; therefore, the power exceeds the threshold value D, and then, is always constant (N) in the first to third stage irradiation times.

On the other hand, in the fourth to seventh stage irradiation times T4 to T7 longer than the third stage irradiation time T3, the power of laser beam is set to the reference power N from the irradiation start time point to each of the midway time points Y4 to Y7. The midway time points Y4 to Y7 are individually set after intermediate time points M4 to M7 in the irradiation times T4 to T7.

Until the termination time point from the midway time points Y4 to Y7, the low power L and the reference power N are controlled so that these powers can be alternately changed for each predetermined unit time X. Therefore, for each predetermined unit time X, the power is alternately changed into the low power L and the reference power N; in other words, the power is controlled so as to intermittently become larger than the predetermined threshold value D.

In this case, the midway time points Y4 to Y7 are set different from each other in each stages; however, of course, they may be set to the same time point in the fourth to seventh stages.

Then, under the power condition shown in FIG. 7, the laser beam is irradiated to the virtual recording cell 40, and thereby, the virtual recording cell 40 is formed with recording marks having seven (7) stage different optical reflectance.

Figure 8:
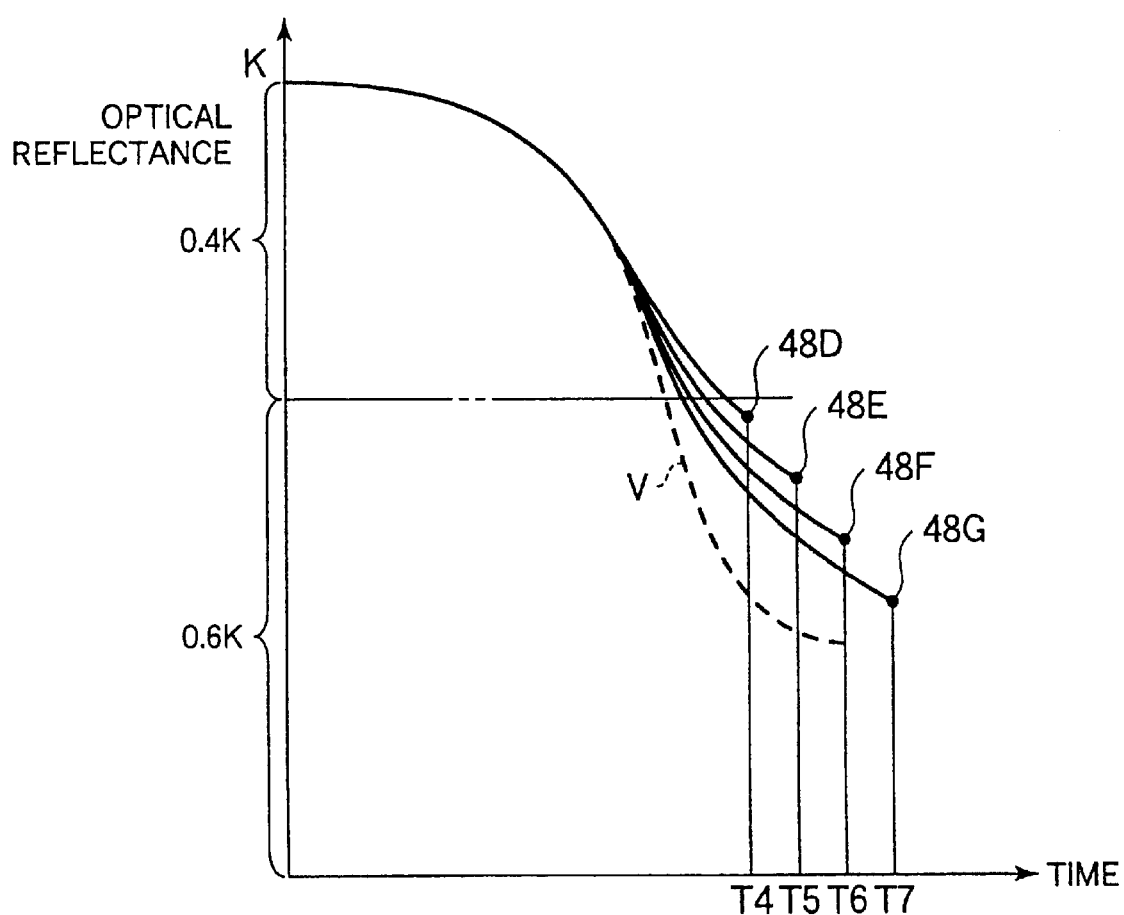
FIG. 8 is a diagram schematically showing a relation between an optical reflectance of virtual recording celll including recording mark formed by the optical recording method and an irradiation time.

FIG. 8 schematically shows a relation between the irradiation times T4 to T7 (T1 to T3 is not shown) and a reduction state of optical reflectance of recording marks 48D to 48G formed by the above irradiation times in the recording method.

In each first half range of the irradiation times T4 to T7, the laser beam (exceeding the threshold value D) is continuously irradiated as it is the reference power N; therefore, the optical reflectance of the recording marks 48D to 48G is reduced at a relatively high speed. On the other hand, in the second half range, the power intermittently exceeds the threshold value D (i.e., the power is intermittently less than the threshold value D); therefore, an increasing speed of accumulated heat in the recording marks 48D to 48G is gradually decreasing, so that a reduction speed of the optical reflectance can be made small.

As a result, the irradiation time T4 to T7 are kept relatively short while each reduction speed of optical reflectance of the recording marks 48D to 48G being gradually restricted; therefore, it is possible to securely stage the reduction speed at a desired optical reflectance, and to improve each read accuracy of the recording marks 48D to 48G.

In FIG. 8, the dotted line V shows the case where the laser beam continues to be irradiated as it is the reference power N. The longer the irradiation time becomes, the more the reduction speed of the optical reflectance increases. Even if the laser beam irradiation is completed as the stage time, a shift is generated in the optical reflectance due to the influence by the accumulated heat; for this reason, it is difficult to control the optical reflectance.

According to the present invention, the optical recording medium and the optical recording method, it is possible to control the optical reflectance with a high accuracy even in a relatively long irradiation time (e.g., the fourth to seventh stages in this embodiment) which has been considered that it is difficult to make multi-stage irradiation in the progress of development. Therefore, the recording marks 48D to 48G can be formed at multiple stages. As a result, it is possible to further increase the number of stages, and to improve a recording density of recording medium.

By the way, in this embodiment, the reason why the power is intermittently made large is not for controlling the width of recording mark. In the optical recording medium, only one recording mark is securely recorded in one virtual recording cell, and the number of stages is recognized by a change of optical reflectance so as to achieve multi-level recording.

More specifically, like the conventional binary recording, under the situation that the "length" of the recording mark must be identified, there is a need of preventing a "width (thickness)" of the long recording mark from increasing in the second half range. For this reason, the laser beam has been divided in its pulse and irradiated (also, this is one of multi-pulse control). However, in this embodiment, considering the optical reflectance, in order to form the recording mark at multiple stages regardless of the length, the power of laser beam is intermittently controlled so as to control a reduction speed of the optical reflectance.

In this embodiment, the power of laser beam has been changed into two stages (reference power N and low power L) so that a recording power can be changed. The power may be changed into three stages or more, and the low power L may be set to "zero" (i.e., OFF). Further, the midway time points Y4 to Y7 have been set after the intermediate time points M4 to M7. The midway time points may be properly set considering the relation with the recording medium. For example, in the case of a recording medium having a large change speed of optical reflectance, an intermittent control of laser beam power may be carried out from the earlier time point (including the irradiation time).

As described in this embodiment, the optical recording medium and the optical recording method are adaptable to the case where the recording layer 12 of the optical recording medium 10 contains an organic dye component. In this case, of course, the present invention may be applicable to other recording layers containing no organic dye component, for example, recording layers formed of inorganic dye and other materials.

The above embodiment has described the case where the above optical recording medium 10 is a CD-R disk. The optical recording medium of the present invention is not limited to the above CD-R disk, and is widely applicable to other optical recording medium. In addition, the optical recording medium of the present invention is not limited to the disk-like rotating element.

Further, the size of the virtual recording cell 40 set when forming the recording mark by the optical recording apparatus 30 is not limited to the above embodiment. In particular, it is preferable that the length of the virtual recording cell 40 is set so as to become equal to the width of the groove 16 so long as the beam waist diameter of laser beam is further made small. On the other hand, in the case of recording the recording mark at multiple stages such as eight stages, the length of the virtual recording cell 40 may be set larger than the laser beam waist. In this case, part of the recording marks can be made into a size more than the beam waist.

Figure 9:
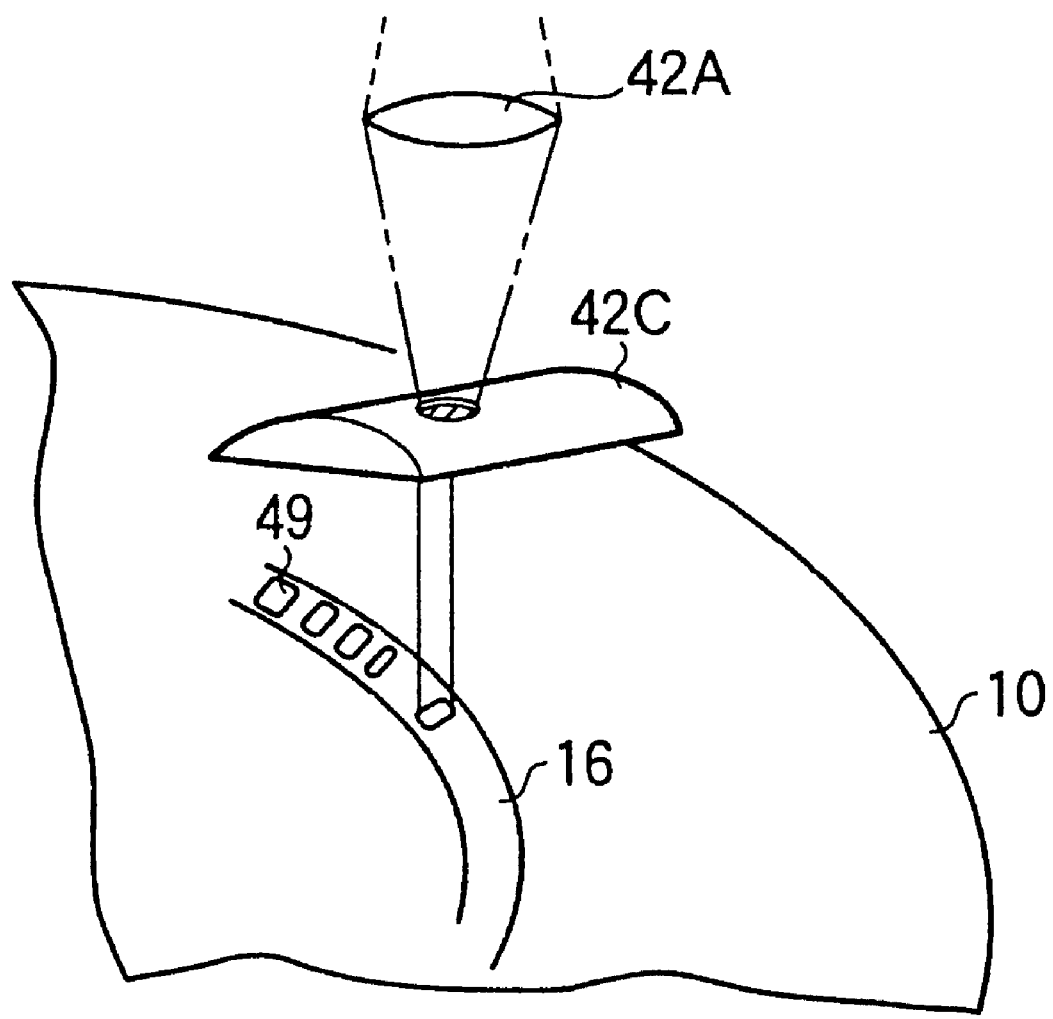
FIG. 9 is a perspective view schematically showing the case where the laser beam irradiated to the virtual recording cell has another shape.

Moreover, the recording laser beam has a circular shape in the recording layer 12. As shown in FIG. 9, however, this can utilize, for example, a beam shaping prism 42C in addition to the objection lens 42A and the beam shape may be formed into an elliptic or linear shape as shown in FIG. 9, which is short in the feed direction of the optical recording medium 10, and is long in the direction perpendicular to the feed direction. In this case, a recording mark 49 becomes short, so that the virtual recording cell can be further shortened. In other words, it is possible to improve a recording density.

Further, the optical recording medium of this embodiment may be constructed so as to previously have a plurality of pits as shown by a reference numeral 52 in FIG. 3, which have the number of different reflectance corresponding to the signal modulation stages of the optical recording medium 10. The following specific information may be recorded in the plurality of pits 52. More specifically, the information includes information for individually identifying the optical recording medium 10, information for identifying whether a recording medium is an optical recording medium for multi-level recording, reference average power information of laser beam for recording and reading the recording medium, intermittent control start timing of the average power, etc. The following case is a concept included in the scope of the present invention. Namely, specific information is read in the optical recording medium 10 in recording, and then, according to the recorded information, the laser beam is irradiated so as to achieve optical recording.

Besides, by the above specific information, it is possible to securely identify whether a recording medium is an optical recording medium for multi-level recording, and to determine an irradiation time of laser beam in accordance with the number of stages of pit previously recorded. Therefore, multi-level recording and reading can be further securely carried out.

As shown by a reference numeral 56 in FIG. 3, the laser beam guide groove is provided with a groove partition, which partially partitions the groove, and thereby, the same effect as above can be obtained. The groove partition may be usable solely or may be combined.

As is evident from the above description, according to the present invention, in a newly multi-level optical recording method, it is possible to form recording marks at multiple stages, and to greatly improve an information recording density.

What is claimed is:

1. An optical recording medium, including a reflective layer and a recording layer, and constructed in a manner that a recording mark is formed on the recording layer by irradiating a laser beam so as to record information, the recording layer being continuously formed in a relative moving direction to the laser beam with plural virtual recording cells, each of which has an arbitrary unit length and a unit width perpendicular to the unit length in the relative moving direction, plural-stage irradiation times being set with respect to the virtual recording cell so that the irradiation time becomes long successively from the first to final stages, a laser beam power being set in at least one irradiation time of the plural-stage irradiation times so as to intermittently become larger than a predetermined threshold value when the laser beam is irradiated to the virtual recording cell, and recording marks being formed in the virtual recording cell, the recording marks giving plural-stages different optical reflectance to the virtual recording cell.

2. The optical recording medium according to claim 1, wherein, the power of laser beam is controlled in at least final stage irradiation time.

3. The optical recording medium according to claim 1, wherein in the case where an optical reflectance of non-recording state in the recording medium is set as K, the power of laser beam is controlled so that the recording mark having an optical reflectance less than 0.6K is formed.

4. The optical recording medium according to any one of claims 1–3, wherein the power of laser beams is controlled from the midway time point to the termination time point in the irradiation time.

5. The optical recording medium according to claim 4, wherein the midway time point is set after the intermediate time point in the irradiation time.

6. The optical recording medium according to claim 1, wherein the irradiation time has at least five stages from the first stage to the final stage.

7. An optical recording medium, including a reflective layer and a recording layer, and constructed in a manner that a recording mark is formed on the recording layer by irradiating a laser beam so as to record information, the recording layer being continuously formed in a relative moving direction to the laser beam with plural virtual recording cells, each of which has an arbitrary unit length and a unit width perpendicular to the unit length in the relative moving direction, plural-stage irradiation times being so that the irradiation time becomes long successively from the first to final stages, and the laser beam being irradiated to the virtual recording cell in accordance with the irradiation times so that recording marks being formed in the virtual recording cell, the recording marks giving plural-stages different optical reflectance to the virtual recording cell and in at least one of the plural-stage irradiation times, the irradiated laser beam being irradiated in a state that the case where the laser beam power is large and the case where it is small are alternately continued so that the recording mark is formed.

8. The optical recording medium according to claim 7, wherein, the power of laser beam is controlled in at least final step irradiation time.

9. The optical recording medium according to claim 7, wherein in the case where an optical reflectance of non-recording state in the recording medium is set as K, the power of laser beam is controlled so that the recording mark having an optical reflectance less than 0.6K is formed.

10. The optical recording medium according to claim 7, wherein the power of laser beam is controlled from the midway time point to the termination time point in the irradiation time.

11. The optical recording medium according to claim 10, wherein the midway time point is set after the intermediate time point in the irradiation time.

12. The optical recording medium according to claim 7, wherein the irradiation time has at least five steps from the first step to the final step.

13. An optical recording method, which irradiates an laser beam to an optical recording medium including a reflective layer and a recording layer, and forms a recording mark is formed on the recording layer so as to record information, comprising the following stages of:

continuously forming plural virtual recording cells, each of which has an arbitrary unit length and a unit width perpendicular to the unit length the recording layer being in a relative moving direction to the laser beam with in the relative moving direction;

setting plural-stage irradiation times with respect to the virtual recording cell so that the irradiation time becomes long successively from the first to final stages;

setting a laser beam power in at least one irradiation time of the plural-stage irradiation times so as to intermittently become larger than a predetermined threshold value when the laser beam is irradiated to the virtual recording cell; and forming recording marks being formed in the virtual recording cell, the recording marks giving plural-stages different optical reflectance to the virtual recording cell.

14. The optical recording method according to claim 13, wherein the power of laser beam is controlled so as to intermittently become larger than a predetermined threshold value in at least final stage irradiation time.

15. The optical recording method according to claim 13, wherein in the case where an optical reflectance of non-recording state in the recording medium is set as K, the power of laser beam is controlled so as to intermittently become larger than a predetermined threshold value so that the recording mark having an optical reflectance less than 0.6K is formed.

16. The optical recording method according to claim 13, wherein the power of laser beam is controlled so as to intermittently become larger than a predetermined threshold value from the midway time point to the termination time point in the irradiation time.

17. The optical recording method according to claim 16, wherein the midway time point is set after the intermediate time point in the irradiation time.

18. The optical recording method according to claim 13, wherein the irradiation time has at least five stages from the first stage to the final stage.

19. An optical recording method, which irradiates an laser beam to an optical recording medium including a reflective layer and a recording layer, and forms a recording mark is formed on the recording layer so as to record information, comprising the following stages of:

continuously forming plural virtual recording cells, each of which has an arbitrary unit length and a unit width perpendicular to the unit length in a relative moving direction to the laser beam, in the relative moving direction, with respect to the virtual recording cell;

setting plural-stage irradiation times so that the irradiation time becomes long successively from the first to final stages, and irradiating the laser beam to the virtual recording cell in accordance with the irradiation times so that forming recording marks being formed in the virtual recording cell, the recording marks giving plural-stages different optical reflectance to the virtual recording cell; and reducing a change speed of optical reflectance of the virtual recording cell in the termination side of the irradiation time in at least one of the plural-stage irradiation times so that the irradiated laser beam being irradiated in a state that the case where the laser beam power is large and the case where it is small are alternately continued so that the recording mark is formed.

20. The optical recording method according to claim 19, wherein the power of laser beam is controlled so as to intermittently become larger than a predetermined threshold value in at least final stage irradiation time.

21. The optical recording method according to claim 19, wherein in the case where an optical reflectance of non-recording state in the recording medium is set as K, the power of laser beam is controlled so as to intermittently become larger than a predetermined threshold value so that the recording mark having an optical reflectance less than 0.6K is formed.

22. The optical recording method according to claim 19, wherein the power of laser beam is controlled so as to intermittently become larger than a predetermined threshold value from the midway time point to the termination time point in the irradiation time.

23. The optical recording method according to claim 22, wherein the midway time point is set after the intermediate time point in the irradiation time.

24. The optical recording method according to claim 19, wherein the irradiation time has at least five stages from the first stage to the final stage.

* * * * *